United States Patent Office 3,232,778
Patented Feb. 1, 1966

3,232,778
METHOD OF FORMING HIGHLY BONDED SHRINK RESISTANT PLASTER COATING
John Dean, San Francisco, Calif., assignor of one-half interest to Sarah Ann Dean, San Francisco, Calif.
No Drawing. Filed Mar. 21, 1963, Ser. No. 266,800
3 Claims. (Cl. 106—97)

This invention relates generally to surface coating compositions, and particularly to a plaster coating composition characterized by an ability to bond as a hard, shrink resistant, moisture proof coating to a wide variety of materials and surfaces.

The use of lime and gypsum for mortar and in surface coatings of various types can be traced back throughout Roman, Greek and Egyptian civilizations and, even today, these materials remain indispensible for mortar and plaster use. For example, fine interior plasters are still composed essentially of lime or gypsum intermixed with sand, powdered marble, wood pulp and the like. The commercial plasters are generally based on gypsum (i.e., plaster of Paris) which almost always is in the form of the half-hydrate, $CaSO_4 \cdot \frac{1}{2} H_2O$. As is well known, these plasters are restricted to interior use as they will not withstand exterior weathering.

Since interior plasters generally have relatively poor bonding characteristics, they are customarily applied upon lath, in the form of thin strips of wood and wire mesh nailed to the wall surface, studding, etc., as a groundwork for the plaster. Lath and plaster surfaces are consequently difficult and expensive to apply, although they are preferred for quality work. Nevertheless, in recent years, the less expensive sheet rocks and similar types of wallboard have found increasing use. These plasterboard materials are not entirely satisfactory, however, since they present unsightly joints which must be filled and taped and sanded in a series of difficult, successive operations. Moreover, shrinkage of the grout or joint filling compound presents additional problems, even to the most highly skilled professionals.

In addition to the foregoing, various types of mixed stuccos have found widespread use for exterior surfaces. These coating materials, generally comprising Portland cement and, commonly, a small percentage of lime, possess superior weathering characteristics but do not compare in surface characteristics to the fine plasters employed for internal wall surfaces. The mixed stuccos must also be employed with reinforcing mesh and lath, as they likewise possess rather poor surface bonding characteristics.

In view of the characteristics noted, plasters, stuccos, and similar surface coatings have developed along rather specialized lines, depending on whether they are intended for interior or exterior use, whether they must be fire or moisture resistant, as in kitchens and bathrooms, smooth or textured, white or colored, and so on. In contrast, the industry has been constantly seeking a plaster-like composition which could be used as either an interior or an exterior surface, which would possess good bonding characteristics, a hard scuff resistant surface, and which desirably would be both fire and moisture resistant. To date, no entirely satisfactory composition has been found.

In general, it is an object of the present invention to provide a plaster coating composition and procedure which will provide a practical solution to the above problems, and to many additional problems, as will appear.

Another object of the invention is to provide a plaster coating composition and procedure which can be successfully used in conventional manner as a trowelable mix, or alternatively, in a composition suitable for brushing, rolling or spraying.

Another object of the invention is to provide a hard, scuff resistant, fire proof plaster coating composition which is characterized by a ready ability to bond to a wide variety of materials and surfaces, thereby eliminating the need for wire mesh and lath.

Another object of the invention is to provide a coating composition which is suitable to both interior and exterior use, and which possesses good weathering characteristics.

Another object of the invention is to provide a bondable plaster coating composition which is essentially shrink resistant, regardless of thickness, thereby eliminating the common fault of cracking and peeling during drying and setting.

Another object of the invention is to provide such a plaster coating composition which can be readily modified by the addition of various materials, for example to enhance insulating or acoustical properties, to achieve a desired texture or color, and so on.

Additional objects and features of the invention will appear from the following description in which a preferred embodiment of the invention has been set forth in detail.

The plaster coating composition of the present invention consists essentially of a base mixture comprising in the major proportion a mixture of Portland cement and calcined gypsum, and in minor proportion calcined lime or "quicklime." Preferably, my plaster coating composition also contains a small amount of diatomaceous silica to enhance workability. It may also contain casein or other agent to assist in bonding, and a retarder to inhibit the setting of the plaster. In preparing my new plaster composition, the ingredients are advantageously mixed dry (e.g., in an agitated mixer) to provide a dry mix or blend capable of use upon addition of water in appropriate amounts. For example, a trowelable mix can then be prepared on the job by admixing a small amount of water with the dry mix or, if desired, a wet mix suitable for brushing, rolling, or spraying can be prepared by adding slightly larger amounts of water. Alternatively, the ingredients can be premixed with water, and the resultant composition suitably packaged for sale.

It is a feature of my invention that the plaster coating composition so prepared can be applied to virtually any surface, whether vertical or horizontal, including sheetrock, plywood, painted surfaces, fiber glass, Styrofoam, or similar foamed materials, and with substantially a permanent bond. The shrink resistant characteristics of my plaster composition make it particularly suited to application on sheetrock, since the joints can be filled or the entire wall surface covered, in a single operation. The composition also dries to a hard, scuff resistant, moisture proof surface (due primarily to the combination cement and gypsum base), which is suited to a wide variety of constructional purposes. For example, when my plaster coating compositions are bonded directly to Styrofoam, cork, fiber glass, or like insulating materials, they provide a sheet material which can be successfully used in low cost refrigeration systems and the like.

Desired results can be obtained in accordance with my invention by the use of specific ingredients which conform to many other necessary requirements. Thus, the Portland cement employed can be any one of a wide variety of relatively inexpensive, readily available commercial products. For example, while the "white" or "regular" Portland cements are preferred, any of the various commercial types can likewise be employed (i.e., "low heat," "sulphate resisting," etc., see Shreve, "Chemical Process Industries," 2d Ed., pp. 200–202). As is well known, the Portland cements are composed of a mixture of compounds, comprising essentially 60 to 68% CaO, 18 to 20% SiO₂ and small proportions of Al₂O₃, MgO, various alkalies and SO₃ (Shreve, supra, Table IV, at page 208). Thus, a "white" Portland cement preferred for use in my invention differs from a "regular" Portland cement in that it contains somewhat less ferric oxide (i.e., less than 6% and generally between about 1.5 and 3% Fe₂O₃).

The term "gypsum" as used herein refers to the so-called "calcined gypsums" obtained according to the usual method wherein the mineral is ground and placed in large calciners which are heated to about 120 to 150° C. with agitation. The commercial product is either "first settle" plaster, which is approximately the half hydrate, $CaSO_4 \cdot \frac{1}{2} H_2O$, or "second settle" plaster, which is obtained by further heating to 190° C. The latter form is anhydrous. It is contemplated that either form can be employed in making my plaster compositions, although, as is well known, most commercially available gypsum is in the form of "first settle" plaster.

It is desirable to additionally employ an ingredient which is capable of imparting workability and ease of application to the base composition, comprising the mixture of Portland cement and gypsum. A material found particularly satisfactory for this purpose is lime, specifically quicklime or finish lime. Any commercially available lime can be employed, including the so-called "high-calcium" limes, the magnesium limes, or the dolomitic limes. As is well known, the composition and physical properties of lime can be controlled by the selection of the limestone and the detail of the manufacturing process. However, most commercial lime is available as high-calcium quicklime containing not less than 90 percent of calcium oxide and from 0 to 5 percent of magnesia with small percentages of calcium carbonate, silica, alumina, and ferric oxide present as impurities.

To further enhance the workability and ease of application of my plaster composition, I prefer to also employ a small quantity of a diatomaceous silica, and particularly the high quality diatomaceous silica obtained from the quarries located at Lompoc, California. This material has been found to provide a pozzolanic action similar to that of the natural pozzuolanas (e.g., natural volcanic tufts). Such material is not cementitious in itself but becomes so upon admixture with the lime, and effects increased water tightness and resistance to attack by salt or alkaline waters of the plaster composition. However, its principal benefit is in improving the workability and uniformity of the composition thereby reducing the labor required for placing and finishing. This diatomaceous silica also tends to improve uniformity of the product by preventing segregation of the particles in admixture.

In addition to the foregoing ingredients, it is frequently desirable when formulating plaster coating compositions to employ a retarder or inhibitor to slow the rate of plaster setting, thereby preventing premature setting during application or use. Commercial materials include various glues adapted to use in water, tankage from stock yards, and various starch or starch gum compositions including a number of commercially available products formulated for this specific purpose (e.g., Amadex, Corn Products, Inc., composed of about 80% dextrin and starch with about 5% each of water, borax, dextrose and soda ash or cream of tartar). A bonding agent such as casein may also be employed to enhance the bonding characteristics of the plaster coating composition. However, the use of these materials is optional. The basic composition itself possesses unusual bonding characteristics, and an ability to set up without any use of retarder within a period ranging from about two to about four hours. With appropriate use of a retarder, the setting period can be reduced to thirty minutes or less.

Where my plaster coating composition is to be used on interior surfaces requiring insulating or acoustical properties, I have found that desired results can be obtained by the addition of a small amount by weight of a ground or powdered micaceous mineral such as the commercially available perlites, vermiculites, or natural pumices. As is well known, the perlites are essentially hydrated silicates having a major proportion of their silica content combined as sodium aluminum silicate. The commercially available vermiculites likewise essentially comprise hydrated silicas of indefinite composition (e.g., $MgO(FeAl)_2O_3, SiO_2$) which have been expanded by heating to produce soft, inelastic laminae which are then powdered to produce an inert, featherweight material. I have found that about 0.1 to 5% by weight of such materials (about 100 to 800% by volume), when mixed into my plaster composition, will provide exceptional sound absorbing characteristics as well as insulating characteristics.

In general, and assuming that the plaster coating composition is formulated from cement (e.g., white Portland cement), gypsum (e.g., calcined gypsum), lime (e.g., calcined finish lime), extender (e.g., diatomaceous silica), bonding agent (e.g., casein), a retarder (e.g., dried tankage), and a lightweight filler (e.g., vermiculite), the proportions may range as follows:

|  | Percent |
|---|---|
| Cement | 20 to 50 |
| Gypsum | 20 to 40 |
| Lime | 10 to 25 |
| Extender | 5 to 25 |
| Bonding agent | 0.1 to 5 |
| Retarder | 0.1 to 2 |
| Lightweight filler | 0.1 to 5 |

The foregoing general range of ingredients is specified to make clear that the invention is not limited to certain of the ingredients that may be disclosed herein by way of example.

As previously indicated, the desired characteristics of the above plaster coating composition can be utilized by adding a small amount of water to a dry mix of the ingredients, following which the plaster coating composition can be trowelled onto a wall surface in conventional manner. Alternatively, a more fluid mix can be varied by the addition of slightly larger amounts of water, permitting the plaster coating composition to be brushed or sprayed onto the wall surface with conventional brush or spray equipment, or to be rolled on such surface with a conventional paint roller.

The following examples are illustrative of the practice of the present invention.

*Example 1*

One very satisfactory plaster coating composition has been formulated as follows:

|  | Lbs. | Ozs. |
|---|---|---|
| White Portland cement | 8 | 0 |
| Calcined gypsum | 6 | 0 |
| Calcined finish lime | 3 | 6 |
| Diatomaceous silica (Celite, Johns-Manville) | 1 | 6 |
| Casein | 0 | 6 |
| Powdered expanded vermiculite (Zonolite, The Zonolite Co.) | 0 | 2 |
| Retarder (Amadex, Corn Products, Inc.) |  | 1 |

In formulating the above ingredients, approximately equal proportions by volume of the dry cement, gypsum, lime, silica and vermiculite were mixed together in an agitating container, the casein and retarder then added, and the mixture agitated further until suitably mixed for placing in cans, sacks, or other containers.

*Example 2*

A wet coating composition suitable for troweling on a wall surface was prepared by mixing the dry ingredients of Example 1 with an approximately equal amount of water, as follows:

Dry mix _____lbs__ 40
Water _____gals__ 5

When applied in conventional manner upon an interior wall surface constructed of sheetrock panels, the resulting plaster coating composition filled the open joints between the panels and provided a smooth wall surface resembling conventional plaster in every way. The compostion set to a hard surface in about two hours without any evidence of shrinkage. During a succeeding period of about one year, the plaster coating composition was observed to retain a hard, scuff resistant surface which was free of cracks and which was waterproof.

The coating composition was similarly applied to an existing exterior wall surface, where it was exposed to normal weathering. At the end of a year, the surface was substantially in its original form, and showed no visible sign of weathering.

*Example 3*

A plaster coating composition suitable for brushing, rolling, or spraying was similarly prepared by mixing approximately 3 parts of the dry mix (Example 1) with 2 parts of water, as follows:

Dry mix _____lbs__ 27
Water _____gals__ 5

The resulting product was employed as a brush coating on wall surfaces, also as a roller coating and as a spray coating, in a manner corresponding to the conventional use of a typical, thick house paint. Two applications of the material produced a plaster coating equivalent in thickness and general appearance to a conventional plaster coating, although the individual surfaces had the appearance of brushed, roll coated, and spray coated surfaces. In use, each of the surfaces was observed to be exceptionally hard and scuff resistant, as well as moisture proof.

*Example 4*

As a further example, a plaster coating composition was prepared at a building site, in the following proportions:

| | Amount |
|---|---|
| Regular Portland cement _____sacks__ | 1 |
| Calcined gypsum _____do____ | 1 |
| Finish lime _____do____ | 1 |
| Diatomaceous silica (Celite) _____do____ | 1 |
| Powdered vermiculite (Zonolite) _____lbs__ | 2 |
| Casein _____do____ | 1 |
| Retarder (e.g., Amadex) _____do____ | 1½ |

As is well known in the art, the term sack defines a standard unit of about 94 pounds. The dry ingredients were thoroughly mixed in a conventional cement mixer, and 25 gallons of water added, and the wet mixture subjected to further thorough agitation. The mix was then applied to a wall surface in the manner described in Example 1, with similar results.

To those skilled in the art to which this invention relates, many changes in the procedures and widely differing embodiments and applications of the invention will suggest themselves without departing from the spirit and scope of the invention. For example, various coloring or tinting agents can be incorporated into the formula, without any change in the basic utility of the composition. In addition, the composition can be applied to produce various textured surfaces, such as stippled or striated surfaces, in conventional manner. The plaster coating compositions can also be used in steamy or moist areas where conventional plaster compositions would present serious problems. Thus, the plaster coating composition of the invention can be used in shower rooms, bathrooms, kitchens, basements, and various other areas where dampness or varying conditions of moisture are normally experienced. It also can be applied directly to exposed exterior surfaces, where it has so far demonstrated an ability to withstand all normal weathering. My plaster composition is also useful in a wide variety of nonconventional applications, some of which have been mentioned above, for example in making low cost refrigeration panels, as a paint-like coating on sheetrock, plywood, painted surfaces, or over old plaster or concrete surfaces, and so on. Accordingly, it should be understood that the disclosures herein are purely illustrative and not intended in any sense to be limiting.

I claim:

1. A method of forming a highly bonded, shrink resistant, substantially moisture proof, hard set plaster coating comprising applying to a surface with which the plaster coating will form a substantially permanent bond, a mixture in water of from about 20 to 50 percent Portland cement, from about 20 to 40 percent calcined gypsum, about 10 to 25 percent lime, and about 5 to 25 percent extender, and permitting said coating to harden and bond to said surface.

2. A method of forming a highly bonded, shrink resistant, substantially moisture proof, hard set plaster coating comprising applying to a surface with which the plaster coating will form a substantially permanent bond, a mixture consisting essentially of about 25 to 50 percent Portland cement, about 20 to 40 percent calcined gypsum, about 10 to 25 percent quicklime, about 5 to 25 percent diatomaceous silica, and water in proportion to provide a trowelable mix, and permitting said applied coating to harden and bond to said surface.

3. A method of forming a highly bonded, shrink resistant, substantially moisture proof, hard set plaster coating comprising applying and bonding to a surface with which the plaster coating will form a substantially permanent bond, a mixture in water consisting essentially of:

| | Percent |
|---|---|
| White Portland cement _____ | 20 to 50 |
| Calcined gypsum _____ | 20 to 40 |
| Calcined lime _____ | 10 to 25 |
| Diatomaceous silica _____ | 5 to 25 |
| Casein _____ | 0.1 to 5 |
| Powdered expanded vermiculite _____ | 0.1 to 5 |
| Retarder _____ | 0.1 to 2 |

References Cited by the Examiner

UNITED STATES PATENTS

| 613,085 | 10/1898 | Smith _____ | 106—97 |
| 1,912,883 | 6/1933 | Blank _____ | 106—89 |
| 1,923,370 | 8/1933 | Hansen _____ | 106—89 |
| 2,187,668 | 1/1940 | Smith _____ | 106—91 |
| 2,212,811 | 8/1940 | Hann _____ | 106—89 |
| 2,406,757 | 9/1946 | Gardner _____ | 106—89 |
| 2,546,586 | 3/1951 | Cross _____ | 106—98 |
| 2,715,583 | 8/1955 | Ziegler _____ | 106—97 |
| 2,890,966 | 6/1959 | Moore _____ | 106—91 |

FOREIGN PATENTS

| 4679/13 | 2/1914 | Great Britain. |

TOBIAS E. LEVOW, *Primary Examiner.*